United States Patent [19]

Halliday et al.

[11] 4,428,549
[45] Jan. 31, 1984

[54] ARRANGEMENTS FOR MOUNTING A PROBE ON AN AIRCRAFT

[75] Inventors: David P. Halliday; John F. Riley; Barry Sharrock, all of Preston, England

[73] Assignee: British Aerospace Public Limited Company, London, England

[21] Appl. No.: 314,416

[22] Filed: Oct. 23, 1981

[30] Foreign Application Priority Data

Oct. 24, 1980 [GB] United Kingdom ............... 8034415

[51] Int. Cl.³ ............... B64D 47/00; B64C 39/12
[52] U.S. Cl. ................... 244/1 R; 244/45 A; 244/129.1; 244/131; 73/182
[58] Field of Search ............... 244/1 R, 1 A, 45 A, 244/46, 48, 12.4, 129.1, 131; 73/180, 182, 183, 861.65, 861.67

[56] References Cited

U.S. PATENT DOCUMENTS

| 2,246,510 | 6/1941 | Diehl | 244/1 R |
| 2,430,793 | 11/1947 | Wells | 244/48 |
| 3,222,926 | 12/1965 | Carver | 73/180 |
| 3,318,146 | 5/1967 | DeLea et al. | 73/861.65 |
| 3,666,209 | 5/1972 | Taylor | 244/12.4 |

FOREIGN PATENT DOCUMENTS 2421524 11/1974 Fed. Rep. of Germany ... 244/45 A

Primary Examiner—S. D. Basinger
Assistant Examiner—Rodney Corl
Attorney, Agent, or Firm—Cushman, Darby & Cushman

[57] ABSTRACT

An aircraft 10 includes a pair of aerodynamic control members 11 pivotally mounted one to each side of the cockpit, each for movement about a pivotal axis P. A probe 13 is carried adjacent the outboard end of each control member in a predetermined orientation by fixed support means 25 anchored to the aircraft body and extending through the aerodynamic control member 11 adjacent the pivotal axis P. By this arrangement, the probe 13 remains in its predetermined orientation with respect to the aircraft irrespective of the angular disposition of the control member. The probe may be an air-data probe.

7 Claims, 5 Drawing Figures

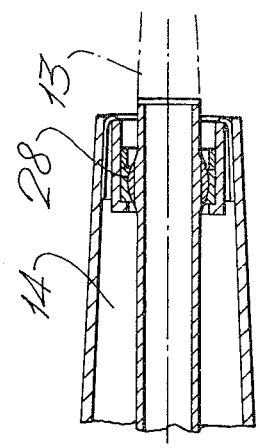
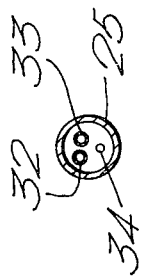
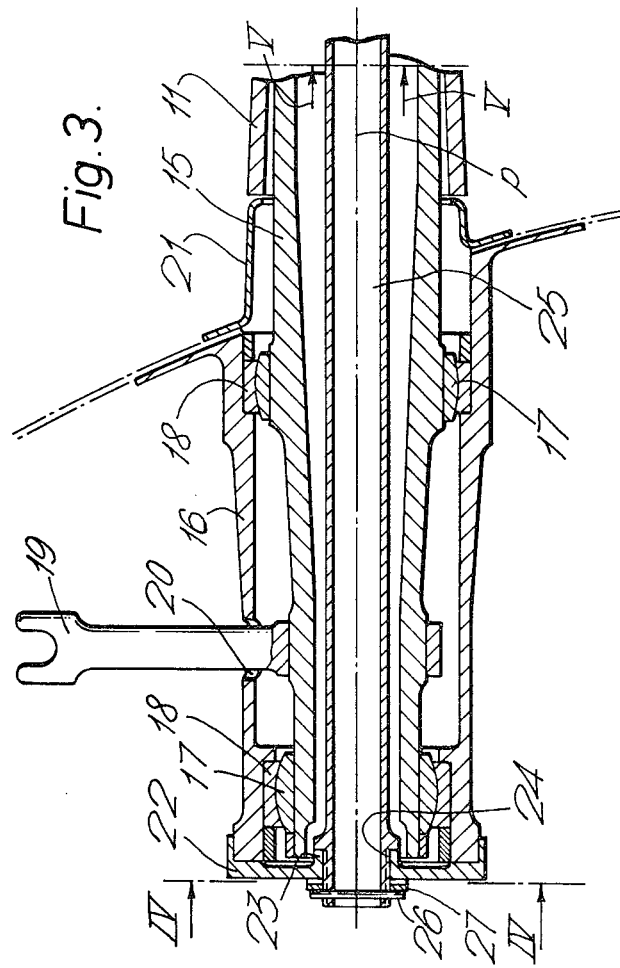
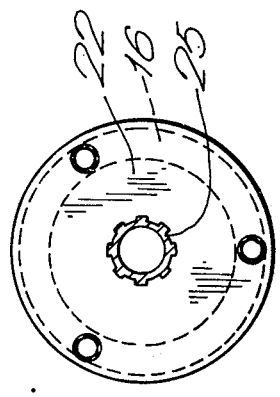

ARRANGEMENTS FOR MOUNTING A PROBE ON AN AIRCRAFT

This invention relates to arrangements for mounting a probe on an aircraft.

When mounting a probe on an aircraft, for example an air-data probe, various considerations must be taken into account. It may be important for the efficient functioning of the probe that the probe is carried outside the region of disturbed airflow over the aircraft during flight. Such considerations have led to the location of a probe in an isolated position of the aircraft, for example on the nose cone, or on the wing tip. These arrangements are disadvantaged by the length of ducting or electrical wiring required to connect the probe to its associated equipment.

In addition, the nose cone may already house sensitive radar equipment which should not be obscured and this possible mounting location for the probe thus is not feasible.

An alternative possibility is to mount the probe on a stem alongside the cockpit of the aircraft but where an aircraft has tiltable foreplanes projecting from this region, this possibility again is not feasible. Moreover, an arrangement in which the probe is mounted on a stem may be subject to unacceptable levels of flexing and vibration during flight. In addition, the stem may disturb the airflow around the aircraft, and it may also be subject to possible accidental damage when the aircraft is on the ground.

Finally, particularly in cases where the probe is an in-flight refuelling probe, it is desirable that the probe be clearly visible by the pilot and this again limits the possible mounting locations.

According to this invention, there is provided an aircraft having a fixed portion, an aerodynamic control member projecting from the fixed portion and mounted thereon for tilting movement about a generally spanwise pivotal axis, and a probe carried adjacent the outboard end of the control member in a predetermined orientation by fixed support means anchored to the fixed portion and extending through said aerodynamic control member adjacent the pivotal axis.

In this arrangement the orientation of the probe with respect to the fixed portion remains unchanged, irrespective of the angular disposition of the aerodynamic control member. Moreover the aerodynamic control member at least partially protects the fixed support means from the force of the airflow when the aircraft is in flight and the fixed support means is therefore subjected to smaller flight loads as compared with conventional stem-mounted probes. In addition, the part of the fixed support means shielded by the aerodynamic control member need not be shaped to suit the surrounding airflow and hence a reduction in the materials and finishing required for the fixed support member may be achieved.

In order to reduce flexing or vibration of the fixed support means, a region of the fixed support means adjacent the probe may be carried in a bearing arrangement associated with the outboard end of the aerodynamic control member.

Conveniently, the fixed support means for the probe comprises a hollow tube member extending generally coaxially with the pivotal axis, and any ducting or wiring associated with the probe may be fed along the inside of the tube to the aircraft body.

In one embodiment the aerodyamic control member extends transversely from the front fuselage portion of the aircraft, adjacent the cockpit region. Moreover, the aerodynamic control member may be in the form of a foreplane or the forward wing of any twin-winged aircraft arrangement.

By way of example only, one specific embodiment of aircraft constructed in accordance with this invention will now be described in detail, reference being made to the accompanying drawings, in which:

FIG. 3 is a section view taken on lines III—III of FIG. 1;

FIG. 4 is an end view taken on lines IV—IV of FIG. 3; and

FIG. 5 is a section view on an enlarged scale, taken on lines V—V of FIG. 4.

Figure 1:
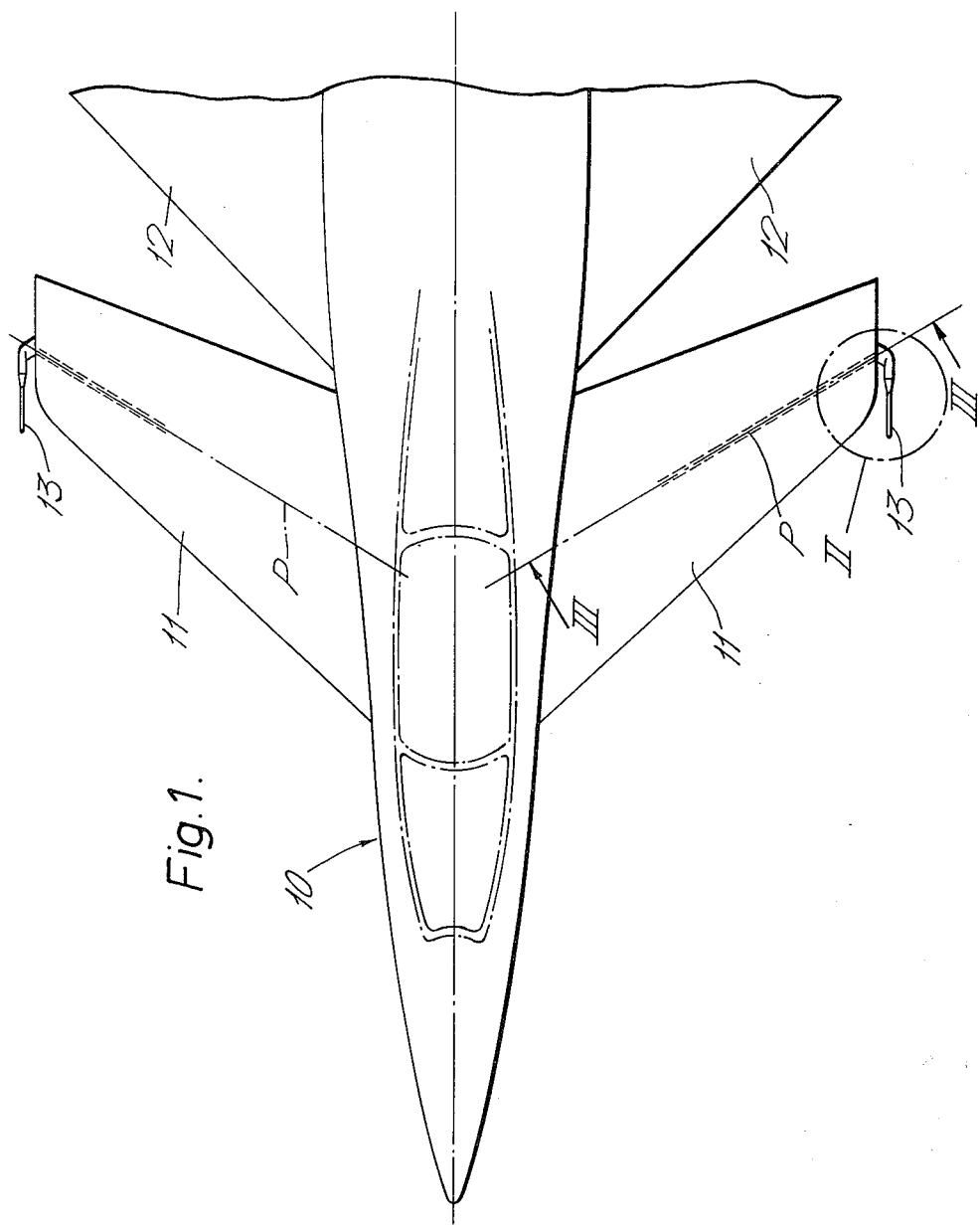
FIG. 1 is a top plan view of part of an aircraft of this invention.
Figure 2:
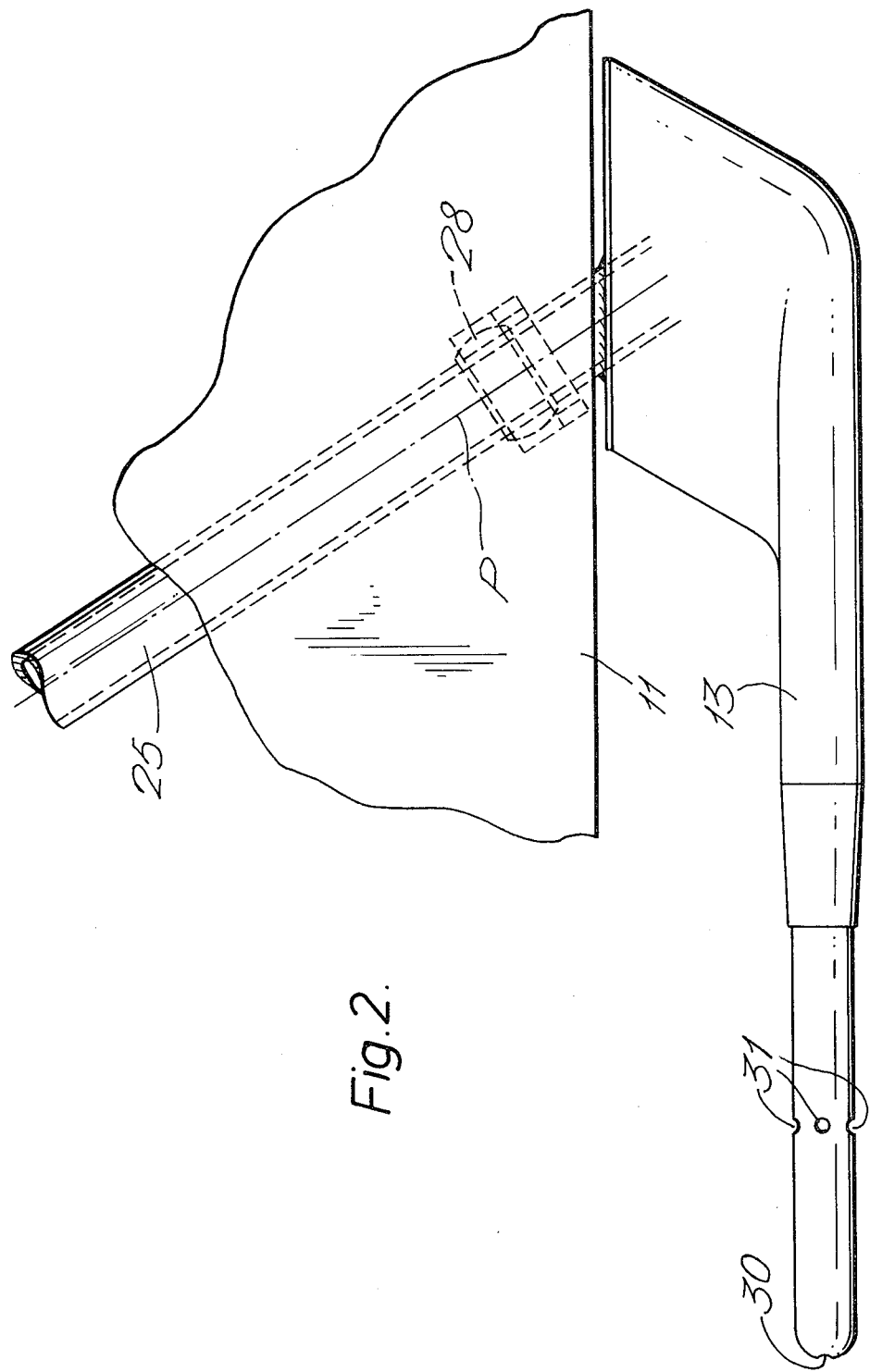
FIG. 2 is a detail view of the part of the arrangement shown in FIG. 1 indicated by ring II.

Referring to FIG. 1, there is shown an aircraft 10 which includes a pair of aerodynamic control surfaces each in the form of a foreplane 11 pivotally mounted one to each side of the cockpit, forward of the main wings 12; the foreplanes 11 are all moving each about a pivotal axis P. An air data probe 13 is mounted adjacent the tip of each foreplane 11 and is fixed with respect to the fixed portion of the aircraft.

Referring now to FIG. 3, each foreplane 11 is provided with a passage 14 extending coaxial with the pivotal axis P of the foreplane. A hollow cylindrical spigot 15 is secured to the inboard end of passage 14 and is aligned with its axis substantially coincident with the pivotal axis P of the foreplane 11. From its attachment to the foreplane 11, the spigot 15 extends away therefrom to be carried within the aircraft front fuselage by a generally cylindrical housing 16 which is attached to the aircraft main body. The inboard portion of spigot 15 carries two spaced spherical bearing members 17, which engage associated race members 18 attached to the cylindrical housing 16, thereby allowing rotation of the spigot 15—and thus the foreplane 11—with respect to the main fuselage about pivotal axis P. A torque lever 19 is secured to the spigot 15 intermediate the bearing members 17, and extends through a slot 20 cut in the cylindrical housing 16 to engage associated actuation equipment (not shown). A boot 21 is positioned around the spigot 15, between the foreplane 11 and the cylindrical housing 16 to prevent the ingress of dirt into the cylindrical housing 16.

A cap 22 is bolted to the innermost end of the cylindrical housing 16, as shown in FIG. 4. The cap has a central boss 23 which is provided with a splined bore 24. The correspondingly splined end of a fixed support tube 25 engages the splined bore 24 and is secured to the cap 22 by means of a pin 26 and thrust washer 27 to prevent rotational and axial movement of the fixed support tube 25 with respect to the cap 22. The fixed support tube 25 extends from the cylindrical housing 16, through passage 14 to the tip of the foreplane 11, coaxial with the pivotal axis P. The outermost end region of the fixed support tube 25 is rotatably supported within the foreplane 11 by means of a bearing arrangement 28 secured within the outermost end of the passage 14.

An air data probe 13 is attached to the end of the fixed support tube 25 and aligned parallel with the longitudinal axis of the aircraft fuselage. The probe has pitot and static ports 30 and 31 respectively and includes a heating element (not shown).

Pitot and static pressure pipes 32, 33 are connected to their associated ports and the pipes, together with a heating cable 34, are fed along the inside of fixed support tube 25 for connection with associated equipment (not shown) housed within the aircraft main body.

When the foreplane 11 is turned about its pivotal axis, the orientation of the air data probe remains unchanged with respect to the aircraft main body. Although in the above-described embodiment the probe is an air data probe, it will of course be understood that the arrangement may be used for other forms of probe, for example an in-flight refuelling probe.

We claim:

1. An aircraft having a fuselage portion, a main wing portion, an aerodynamic control surface projecting transversely from the fuselage at a location generally forwardly of the main wing portion and a probe carried adjacent the outboard end of the aerodynamic control surface in a predetermined, fixed orientation, with respect to said fuselage, said aerodynamic control surface being carried by bearing means associated with the fuselage portion for tilting movement about a generally spanwise pivotal axis with respect to said fuselage, said probe being carried by a fixed elongate support means anchored to the fuselage and extending through said aerodynamic control member and said bearing means generally along said pivotal axis.

2. An aircraft as claimed in claim 1, wherein a region of the fixed support means adjacent the probe is carried in a bearing arrangement associated with the outboard end of aerodynamic control member.

3. An aircraft as claimed in claim 1 wherein the fixed support means comprises a hollow tube member extending generally coaxially with said pivotal axis.

4. An aircraft as claimed in claim 1, wherein the aerodynamic control member extends transversely from the front fuselage portion of the aircraft, adjacent the cockpit region.

5. An aircraft as claimed in claim 1, wherein the aerodynamic member is in the form of a foreplane.

6. An aircraft as claimed in claim 1, wherein the probe is an air-data probe.

7. An aircraft as claimed in claim 1, wherein the bearing means comprise a sleeve means generally co-axial with said pivotal axis being fixedly secured to the aerodynamic control surface and being rotatably supported with respect to the fuselage portion.

* * * * *